United States Patent Office 3,434,999
Patented Mar. 25, 1969

3,434,999
VULCANIZATION OF RUBBER BY USE OF AMINE BORATE ACTUATORS
Raymond Thompson, Esher, Surrey, and James D. Harris, Macclesfield, Cheshire, England, assignors to United States Borax & Chemical Corporation, Los Angeles, Calif.
No Drawing. Filed July 11, 1966, Ser. No. 563,958
Claims priority, application Great Britain, July 20, 1965, 30,880/65
Int. Cl. C08c *11/66*
U.S. Cl. 260—41.5                              13 Claims

ABSTRACT OF THE DISCLOSURE

The vulcanization of rubber containing siliceous material is accelerated by use of an amine borate activator, such as the cyclohexylamine borates, morpholine borate and alkanolamine borates.

---

This invention relates to the vulcanization of rubber, and in particular to the use of amine borates as activators for the vulcanization of rubber, especially rubber containing siliceous fillers.

Siliceous materials, for instance silica and aluminum silicate are used on a large scale as fillers for rubber in the production of white and light-colored rubber compositions. However, the use of these fillers suffers from the disadvantage that it results in deactivation of the accelerators used in the vulcanization of rubber containing the fillers; presumably the accelerators are adsorbed on the surface of the fillers. This results in a reduction in the rate of vulcanization (cure) and consequently an increase in the time necessary to reach a satisfactory degree of vulcanization. Since any increase in vulcanization time has a serious effect on the economics of the production of vulcanized rubber on a commercial scale, it has been recognized that some means of offsetting the de-activating effect of the siliceous fillers is necessary and various substances have been proposed as "vulcanization activators."

It has been found, according to the present invention, that amine borates are very effective as vulcanization activators. The invention accordingly comprises, in one aspect, the process of vulcanizing rubber, especially rubber containing a siliceous or other inorganic filler, in which there is used as vulcanization activator, an organic amine borate.

The amine borates used as activators are preferably cyclohexylamine borates, especially cyclohexylamine triborate and cyclohexylamine tetraborate. It has been found that cyclohexylamine tri- and tetraborates are superior to polyethyleneglycol—a vulcanization activator in common use—especially with regard to rate of vulcanization and resistance to scorch. Other amine borates that can be used are, for example, morpholine borate and the alkanolamine borates such as triethanolamine borate and triisopropanolamine borate.

Cyclohexylamine tri- and tetraborates and methods for preparing them are disclosed and claimed in U.S. Patent No. 3,247,251 issued Apr. 19, 1966 to Michael Peter Brown, Anthony Edward Dann and Derek Graham Older.

The amount in which the vulcanization activator of the invention is used depends on a variety of factors, including the nature and amount of the filler and vulcanization accelerator, and suitable quantities can readily be ascertained by simple experiment. Where the activator is cyclohexylamine tri- or tetraborate, the activator is conveniently used in an amount by weight of from about 0.1 to about 5 parts to 1 part accelerator and, preferably, about equivalent amounts by weight of accelerator and activator are used.

Rubber compositions for vulcanization containing an activator of this invention can be mixed and cured by means of conventional techniques, the activator being conveniently incorporated in the rubber composition at the same time as the accelerator for example in a Banbury mixer.

The invention is illustrated by the following examples but it is not intended to be limited to the specific examples given. Unless otherwise specified, "parts" referred to are by weight.

Example I

The base stock used in this example had the following composition:

| | Parts by weight |
|---|---|
| Styrene-butadiene rubber (SBR 1502) | 100 |
| Silicia filler (Manosil VN 3) | 50 |
| Zinc oxide | 3 |
| Stearic acid | 1 |
| Coumarone resin | 3 |
| Sulfur | 2.25 |

Four compositions A, B, C, and D were prepared using the following accelerators and activators:

A—1 part mercaptobenzthiazole (MBT), 2 parts diphenylguanidine (DPG). (This is a combination commonly used for SBR/Manosil VN 3 compositions.)
B—1 part MBT, 1 part DPG, 2 parts polyethylene glycol (PEG 6000).
C—1 part MBT, 1 part DPG, 2 parts cyclohexylamine triborate.
D—1 part MBT, 1 part DPG, 2 parts cyclohexylamine tetraborate.

The compositions were mixed in the laboratory Banbury mixer, accelerators and activators being incorporated at this stage. Sulfur was added on the two-roll mill. Plasticity and scorch characteristics were determined on the uncured stocks at 120° C. to assess processing behavior, and test slabs were cured for different times at 153° C. The minimum cure time required to obtain a satisfactory cure for each composition was determined and tensile strength, elongation at break, modulus, tear resistance and hardness of the resulting vulcanized rubbers were measured. Results obtained are given in Table 1.

TABLE 1

| Composition | A | B | C | D |
|---|---|---|---|---|
| Activator used | None | PEG 6,000 | (¹) | (²) |
| Mooney plasticity at 120° C. | 98 | 99 | 83 | 88 |
| Mooney scorch time at 120° C. (min.) | 15.1 | 3.4 | 5.8 | 6.1 |
| Estimated minimum cure time (min.) | 5 | 2 | 2 | 2 |
| Estimated optimum cure time (min.) | 10 | 7 | 5 | 5 |
| Tensile strength (p.s.i.) | 3,470 | 2,960 | 3,240 | 3,090 |
| Modulus at 300% (p.s.i.) | 380 | 570 | 630 | 680 |
| Percent elongation at break | 800 | 700 | 700 | 650 |
| Tear strength (p.s.i.) | 1,000 | 880 | 870 | 910 |
| Hardness (BS°) | 75 | 75 | 74 | 74 |

¹ Cyclohexylamine triborate.
² Cyclohexylamine tetraborate.

It can be seen from Table 1 that replacement on one part of DPG by two parts of amine borate activator has in every case given a faster cure rate and improved modulus. It appears that less than 2 parts of activator can be used in place of 1 part of DPG to give equivalent cure rates. The cyclohexylamine borates are seen to be superior to PEG 6000 as they gave longer scorch times and slightly faster cure rates.

Example II

A second series of rubber compositions were prepared similar to that of Example I but using the styrene-butadiene rubber SBR 1509 instead of SBR 1502. SBR 1509 has a lower average molecular weight than SBR 1502 and is easier to process. The base stock of this example had the composition:

| | Parts by weight |
|---|---|
| Styrene-butadiene rubber (SBR 1950) | 100 |
| Zinc oxide | 3 |
| Stearic acid | 1 |
| Antioxidant | 1 |
| Coumarone resin | 3 |
| Silica filler (Manosil VN 3) | 50 |
| Sulfur | 2.25 |

Four compositions, E, F, G, and H were prepared containing the same vulcanization accelerators and activators as A, B, C, and D, as follows:

E—1 part MBT, 2 parts DPG.
F—1 part MBT, 1 part DPG, 2 parts PEG 6000.
G—1 part MBT, 1 part DPG, 2 parts cyclohexylamine triborate.
H—1 part MBT, 1 part DPG, 2 parts cyclohexylamine tetraborate.

The four compositions were processed and tested using the conditions described in Example I above. Mooney scorch times were determined after 1 day and also after storage for 3 weeks. The results obtained are given in Table 2.

TABLE 2

| Compositions | E | F | G | H |
|---|---|---|---|---|
| Activator used | None | PEG 6,000 | (¹) | (²) |
| Mooney plasticity at 120° C | 65 | 78 | 69 | 66 |

| | 1 day | 3 weeks | 1 day | 3 weeks | 1 day | 3 weeks | 1 day | 3 weeks |
|---|---|---|---|---|---|---|---|---|
| Mooney scorch time (min.) | 6.4 | 7.4 | 8.0 | 8.1 | 14.5 | 13.0 | 18.7 | 18.6 |
| Minimum cure time (min.) | 3 | | 5 | | 5 | | 5 | |
| Estimated optimum cure time (min.) | 5 | | 7 | | 7 | | 7 | |
| Tensile strength (p.s.i.) | 2,660 | | 2,800 | | 2,800 | | 2,600 | |
| Modulus at 300% (p.s.i.) | 380 | | 360 | | 450 | | 350 | |
| Percent elongation at break | 775 | | 900 | | 775 | | 850 | |
| Tear strength (p.s.i.) | 860 | | 860 | | 900 | | 940 | |
| Hardness (BS°) | 74 | | 75 | | 78 | | 76 | |

¹ Cyclohexylamine triborate.
² Cyclohexylamine tetraborate.

With SBR 1509, the use of activator as a replacement for DPG in a ratio of 2 to 1 has given a slightly reduced rate of cure. Scorch time was, however, considerably lengthened with the cyclohexylamine borates and again these materials gave a better combination of scorch resistance with cure rate than PEG 6000.

Example III

In the following example, cyclohexylamine tetraborate was used as an activator in a natural rubber formulation having the following composition:

| | Parts by weight |
|---|---|
| Natural rubber (RSS.1) | 100 |
| Zinc oxide | 5 |
| Stearic acid | 3 |
| Antioxidant | 1 |
| Silica filler | 50 |
| Sulfur | 2.5 |
| Dibenzthiazyl disulfide | 1 |
| DPG | 1.5 |
| Cyclohexylamine tetraborate | 2.5 |

The composition was prepared in a mixer, apart from accelerators and sufur added on the mill as described in Example I. Results are given in Table 3.

TABLE 3

| | |
|---|---|
| Mooney plasticity at 120° C. | 41 |
| Mooney scorch time at 120° C. (min.) | 14.8 |
| Optimum cure time at 141° C. (min.) | 10 |
| Tensile strength (p.s.i.) | 3800 |
| Mordulus at 300% (p.s.i.) | 400 |
| Percent elongation at break | 810 |
| Tear strength (p.s.i.) | 2080 |
| Hardness (BS°) | 76 |

Various changes and modifications of the invention can be made and, to the extent that such variations incorporate the spirit of this invention, they are intended to be included within the scope of the appended claims.

What is claimed is:

1. In the vulcanization of styrene-butadiene rubber or natural rubber containing a siliceous filler and a vulcanization acelerator, the improvement which comprises incorporating in the uncured rubber composition an activator comprising acyclohexylamine borate, morpholine borate, or alkanolamine borate in an amount corresponding to 0.1 to 5 parts by weight of said activator for each part of said accelerator, and heating the resultant mixture to cure the rubber.

2. The method of claim 1 in which said activator is cyclohexylamine triborate.

3. The method of claim 1 in which said activator is morpoline borate.

4. The method of claim 1 in which said vulcanization accelerator is a sulfur-containing compound.

5. In the method of vulcanizing styrene-butadiene rubber or natural rubber containing a siliceous material by reaction of a vulcanization accelerator with the uncured rubber, the improvement which comprises incorporating in the uncured rubber about 0.1 to about 5 parts of a cyclohexylamine borate activator for each part of said vulcanization accelerator, said parts by weight.

6. The method according to claim 5 in which said cyclohexylamine borate is cyclohexylamine triborate.

7. The method according to claim 5 in which said cyclohexylamine borate is cyclohexylamine tetraborate.

8. A vulcanizable styrene-butadiene rubber or natural rubber composition containing a vulcanization accelerator and an organic amine borate vulcanization activator selected from cyclohexylamine borate, morpholine borate and alkanolamine borates in an amount corresponding to 0.1 to 5 parts by weight of said activator to each part of said accelerator said vulcanizable rubber containing a siliceous filler.

9. The composition according to claim 8 in which said organic amine borate is cyclohexylamine triborate.

10. The composition according to claim 8 in which said organic amine borate is cyclohexylamine tetraborate.

11. The method according to claim 5 in which equivalent amounts by weight of said cyclohexylamine borate and said vulcanization accelerator are employed.

12. The method according to claim 5 in which said vulcanization accelerator is a sulfur-containing compound.

13. The method of claim 1 in which said activator is cyclohexylamine tetraborate.

References Cited

UNITED STATES PATENTS 2,710,401  6/1955  Rowe _____ 106—37
3,247,251  5/1966  Brown et al. _____ 117—154

MORRIS LIEBMAN, Primary Examiner.

SAMUEL L. FOX, Assistant Examiner.

U.S. Cl. X.R.

260—788, 789, 790